United States Patent
Takahata (10) Patent No.: US 9,679,228 B2
(45) Date of Patent: Jun. 13, 2017

(54) IMAGE FORMING APPARATUS, IMAGE FORMING SYSTEM, IMAGE FORMING METHOD, AND NON-TRANSITORY COMPUTER READABLE MEDIUM

(71) Applicant: FUJI XEROX CO., LTD., Tokyo (JP)

(72) Inventor: Koji Takahata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/007,277

(22) Filed: Jan. 27, 2016

(65) Prior Publication Data
US 2017/0004388 A1     Jan. 5, 2017

(30) Foreign Application Priority Data
Jul. 2, 2015   (JP) ................................ 2015-133669

(51) Int. Cl.
G06K 15/00  (2006.01)
H04N 1/00   (2006.01)
G06K 15/16  (2006.01)
G03G 15/00  (2006.01)

(52) U.S. Cl.
CPC ........... G06K 15/005 (2013.01); G03G 15/55 (2013.01); G06K 15/00 (2013.01); G06K 15/16 (2013.01); G06K 15/4065 (2013.01); H04N 1/0092 (2013.01); H04N 1/00567 (2013.01); H04N 1/00633 (2013.01); H04N 1/00915 (2013.01); H04N 1/00923 (2013.01); G03G 15/502 (2013.01); G03G 15/5079 (2013.01); G03G 15/5087 (2013.01); G03G 2215/00569 (2013.01)

(58) Field of Classification Search
USPC ....................................................... 358/1.12
See application file for complete search history.

(56) References Cited

U.S. PATENT DOCUMENTS

| 7,679,759 | B2 * | 3/2010 | Aritomi | G06K 15/02 358/1.13 |
| 8,294,929 | B2 | 10/2012 | Kuwano | |
| 2002/0067925 | A1 * | 6/2002 | Yamano | B41J 2/205 399/1 |
| 2002/0149799 | A1 * | 10/2002 | Hayashi | H04N 1/32502 358/406 |
| 2007/0035757 | A1 | 2/2007 | Aikawa | |

(Continued)

FOREIGN PATENT DOCUMENTS

| JP | 2009-113308 A | 5/2009 |
| JP | 2014-221516 A | 11/2014 |

OTHER PUBLICATIONS

Nov. 25, 2016 Office Action issued in Australian Patent Application No. 2016201193.

Primary Examiner — Jerome Grant, II
(74) Attorney, Agent, or Firm — Oliff PLC (57) ABSTRACT

An image forming apparatus includes a generating unit, a print instruction providing unit, and a display. The generating unit generates print data of a sample sheet if a request for outputting the sample sheet is received while print data formed of plural pages is being generated. The print instruction providing unit provides a print instruction for the print data of the sample sheet after providing a print instruction for the print data that has been generated. The display displays, based on the print data of the sample sheet, an attribute of the sample sheet.

7 Claims, 6 Drawing Sheets

(56) References Cited

U.S. PATENT DOCUMENTS

| | | | |
|---|---|---|---|
| 2007/0086034 A1* | 4/2007 | Morton | G06F 3/1207 358/1.13 |
| 2008/0231888 A1* | 9/2008 | Kuwano | H04N 1/00278 358/1.15 |
| 2008/0260413 A1 | 10/2008 | Kimura | |
| 2009/0027711 A1* | 1/2009 | Mizutani | H04N 1/00347 358/1.13 |
| 2009/0185232 A1* | 7/2009 | Hoshii | H04N 1/6088 358/3.23 |
| 2009/0279119 A1 | 11/2009 | Gerega | |
| 2013/0230845 A1* | 9/2013 | Egan | G01N 33/5302 435/5 |
| 2014/0333944 A1* | 11/2014 | Ueda | G06K 15/02 358/1.12 |
| 2015/0062651 A1* | 3/2015 | Yano | G06K 15/4065 358/1.18 |

\* cited by examiner

IMAGE FORMING APPARATUS, IMAGE FORMING SYSTEM, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-133669 filed Jul. 2, 2015.

BACKGROUND

Technical Field

The present invention relates to an image forming apparatus, an image forming system, an image forming method, and a non-transitory computer readable medium.

SUMMARY

According to an aspect of the invention, there is provided an image forming apparatus including a generating unit, a print instruction providing unit, and a display. The generating unit generates print data of a sample sheet if a request for outputting the sample sheet is received while print data formed of plural pages is being generated. The print instruction providing unit provides a print instruction for the print data of the sample sheet after providing a print instruction for the print data that has been generated. The display displays, based on the print data of the sample sheet, an attribute of the sample sheet.

BRIEF DESCRIPTION OF THE DRAWINGS

An exemplary embodiment of the present invention will be described in detail based on the following figures, wherein.

DETAILED DESCRIPTION

Figure 1:
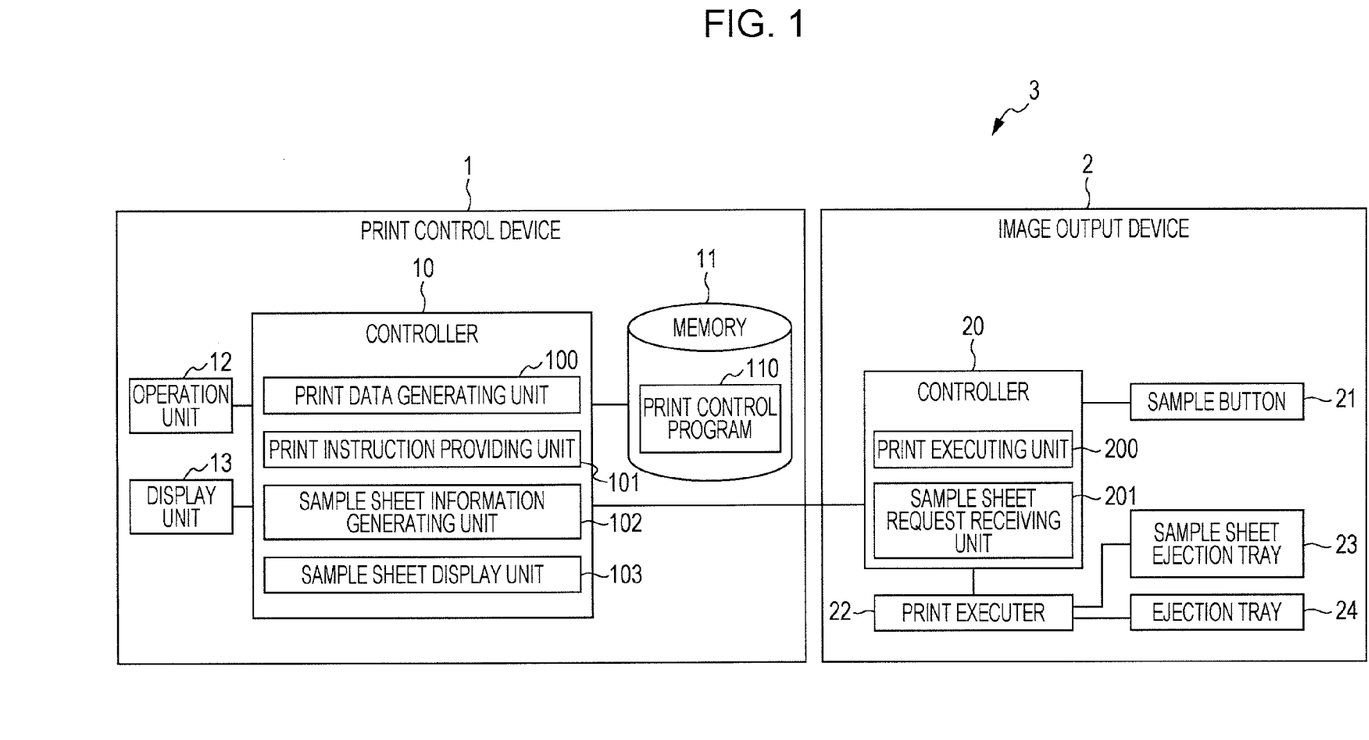
FIG. 1 is a configuration diagram illustrating an example of an image forming apparatus according to an exemplary embodiment of the present invention.

FIG. 1 is a configuration diagram illustrating an image forming apparatus 3, which is an example of an image forming apparatus according to an exemplary embodiment of the present invention.

The image forming apparatus 3 is a digital color printer or the like and is configured to perform, with a print control device 1, image processing on image data received from a host apparatus such as a personal computer so as to convert the image data into color image data of yellow (Y), magenta (M), cyan (C), and black (K), and then to form, with an image output device 2, a color image on a sheet which is an example of a recording medium on the basis of the color image data so as to generate a printed result. Alternatively, the image forming apparatus 3 may be a monochrome printer.

The image forming apparatus 3 is capable of, while generating a printed result formed of plural pages, generating a sample sheet in response to an operation performed by an operator of the image forming apparatus 3. The sample sheet is used for checking colors of a color image formed on a sheet. The generated sample sheet is ejected to an ejection tray different from the one for printed results other than the sample sheet. Attribute information regarding the sample sheet, such as an output image, page number, and estimated time of output of the sample sheet, is displayed on a display unit 13 of the print control device 1.

The print control device 1 includes a controller 10, a memory 11, an operation unit 12, and the display unit 13. The controller 10 is formed of a central processing unit (CPU) or the like, controls the individual units, and executes various programs. The memory 11 is formed of a storage medium such as a flash memory and stores information. The operation unit 12 inputs information in response to an operation performed by an operator. The display unit 13 is a liquid crystal display (LCD) or the like that displays characters and figures.

The controller 10 executes a print control program 110, which will be described below, and thereby functions as a print data generating unit 100, a print instruction providing unit 101, a sample sheet information generating unit 102, a sample sheet display unit 103, and so forth.

The print data generating unit 100 receives a print job from a host apparatus such as a personal computer, performs image processing on image data included in the received print job so as to convert the image data into color image data of yellow (Y), magenta (M), cyan (C), and black (K), and generates print data by including attribute information such as a print method in the image data. Also, when receiving a request for generating a sample sheet, the print data generating unit 100 generates print data for the sample sheet by using the image data of the received print job.

The print instruction providing unit 101 transmits the print data generated by the print data generating unit 100 to the image output device 2 and provides a print instruction on the basis of the attribute information.

The sample sheet information generating unit 102 generates sample sheet information, which is attribute information representing an output image, and page number of the sample sheet to be output, time when the sample sheet will be ejected, and so forth.

The sample sheet display unit 103 displays, on the display unit 13, the details of the sample sheet information generated by the sample sheet information generating unit 102.

The memory 11 stores the print control program 110 that causes the controller 10 to function as the above-described units 100 to 103.

The image output device 2 includes a controller 20, a sample button 21, a print executer 22, a sample sheet ejection tray 23, and an ejection tray 24. The controller 20 is formed of a video interface card or the like, controls the individual units, and mainly executes printing. The sample button 21 is used to request generation of a sample sheet. The print executer 22 executes printing on a sheet. The sample sheet ejection tray 23 and the ejection tray 24 receive printed results generated by the print executer 22 and ejected thereto. Specifically, a sample sheet is ejected to the sample sheet ejection tray 23, and printed results other than the sample sheet are ejected to the ejection tray 24. The tray to which a printed result is to be ejected is determined on the basis of a print instruction. Alternatively, the same ejection tray may be used for the sample sheet and other printed results by making the sample sheet clearly distinguishable from the other printed results, for example, the ejection direction of the sample sheet may be orthogonal to the ejection direction of the other printed results so that the output positions thereof are largely different from each other.

The controller 20 functions as a print executing unit 200 and a sample sheet request receiving unit 201.

The print executing unit 200 executes printing by operating the print executer 22 in response to an instruction provided from the print instruction providing unit 101 of the print control device 1.

The sample sheet request receiving unit 201 determines, in response to the sample button 21 being operated, that a sample sheet has been requested, and transmits a generation request for the sample sheet to the print data generating unit 100 of the print control device 1.

The print executer 22 of the image output device 2 includes a printing unit and a transporting unit. The printing unit includes a photoconductor, an intermediate transfer belt, a nip region, and a fixing device. Developer images of individual colors including yellow (Y), magenta (M), cyan (C), and black (K) are formed on the photoconductor. The intermediate transfer belt circulates while being in contact with the photoconductor, so that the developer images formed on the surface of the photoconductor are transferred onto the intermediate transfer belt. The developer images on the intermediate transfer belt are transferred onto a sheet in the nip region. The fixing device fixes the developer images to the sheet by using heat and pressure.

The transporting unit of the print executer 22 includes, in an attachable/detachable manner, a feed tray that accommodates sheets as recording media, forms a recording medium transport path extending from the feed tray to the ejection trays, and ejects a sheet on which printing has been performed to the sample sheet ejection tray 23 or the ejection tray 24.

Operation

The operation according to the exemplary embodiment will be described in the order of (1) basic operation, (2) print instruction processing operation, and (3) sample sheet information display operation.

(1) Basic Operation

First, the image forming apparatus 3 receives a print job from a host computer such as a personal computer.

After the image forming apparatus 3 has received the print job, the print data generating unit 100 of the print control device 1 performs image processing on image data included in the received print job so as to convert the image data into color image data of yellow (Y), magenta (M), cyan (C), and black (K). Subsequently, the print instruction providing unit 101 transmits the color image data and a print instruction to the image output device 2.

The print executing unit 200 of the image output device 2 receives the color image data and the print instruction, and causes the print executer 22 to form a color image on a sheet on the basis of the color image data.

After printing has been executed by the print executer 22 of the image output device 2, a resulting printed result is ejected to the ejection tray 24.

While the image forming apparatus 3 is executing printing, the operator of the image forming apparatus 3 may operate the sample button 21 of the image output device 2 in order to check an output image of a printed result of the print job that is currently being executed.

In response to an operation of the sample button 21 performed by the operator, the sample sheet request receiving unit 201 of the image output device 2 determines that a sample sheet has been requested and transmits a generation request for the sample sheet to the print data generating unit 100 of the print control device 1.

Figure 5:
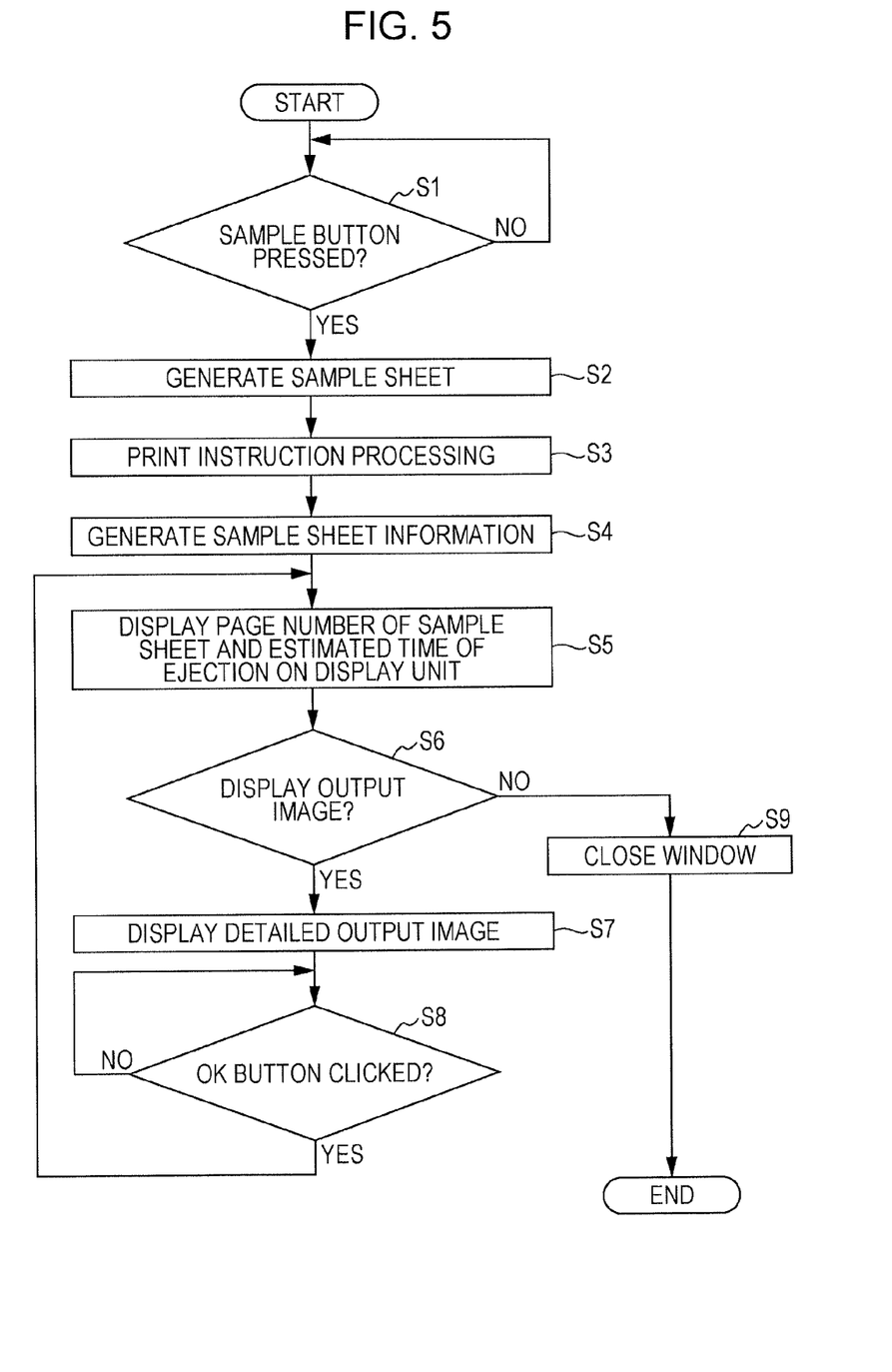
FIG. 5 is a flowchart illustrating an example of operation of a print control device.

FIG. 5 is a flowchart illustrating an example of the operation of the print control device 1.

If the print data generating unit 100 of the print control device 1 receives the generation request for the sample sheet (YES in S1), the print data generating unit 100 generates image data of the sample sheet while a printed result formed of plural pages is being generated (S2), and the print instruction providing unit 101 performs print instruction processing for causing the image output device 2 to print the sample sheet by interrupting the generation of the printed result formed of plural pages (S3). Dedicated image data may be prepared as the image data of the sample sheet. In the description given below, the sample sheet is printed by using image data of any of the pages of the printed result that is being generated, in accordance with a timing at which the sample button 21 is operated.

(2) Print Instruction Processing Operation

Figure 2:
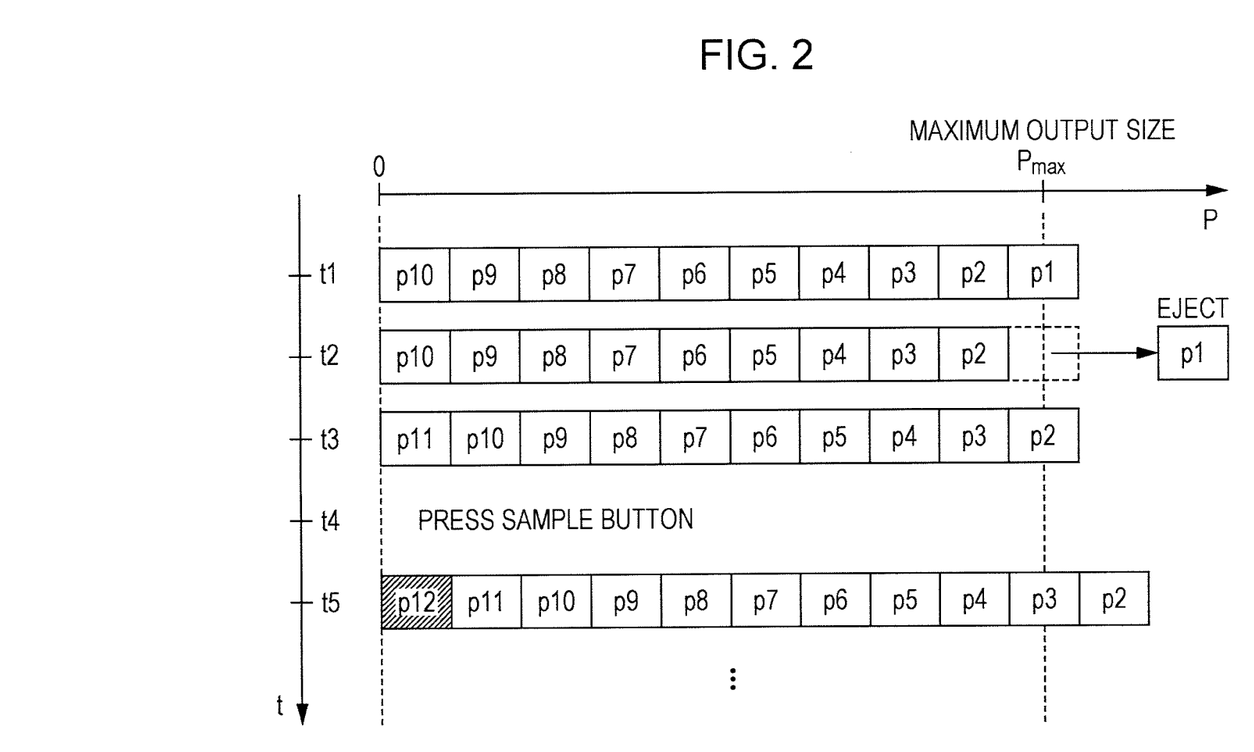
FIG. 2 is a schematic diagram for describing a print instruction processing operation.
Figure 6:
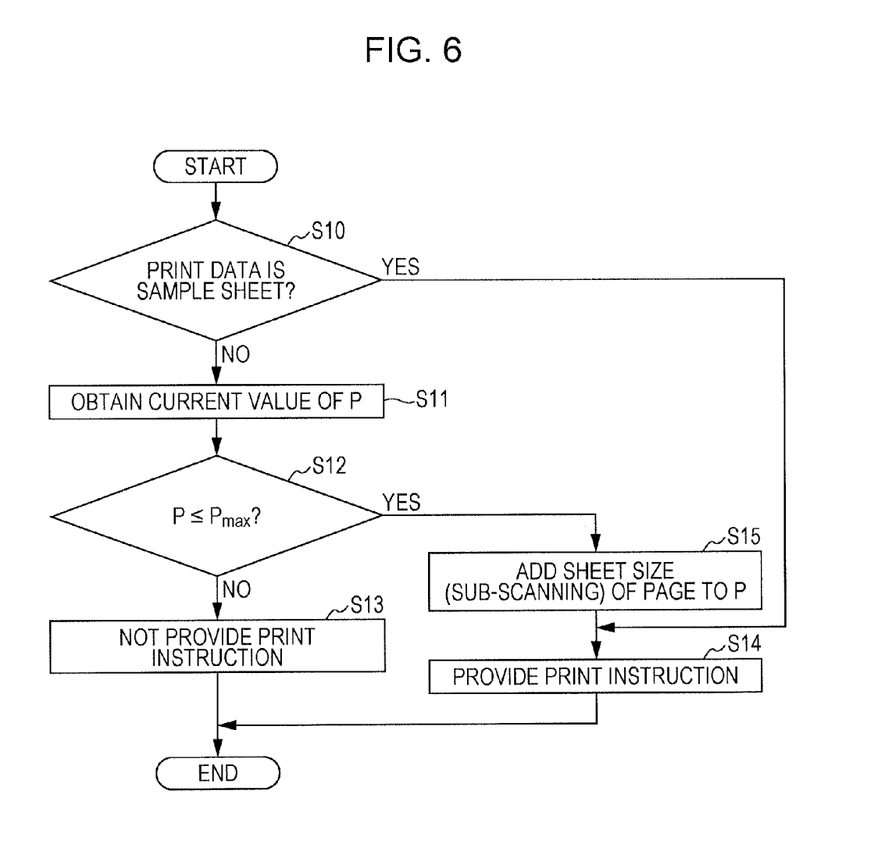
FIG. 6 is a flowchart illustrating an example of a print instruction processing operation.

FIG. 2 is a schematic diagram for describing a print instruction processing operation. FIG. 6 is a flowchart illustrating an example of the print instruction processing operation.

The print instruction providing unit 101 of the print control device 1 provides a print instruction to the image output device 2. However, if a total size P in a sub-scanning direction of sheets existing on the transport path of the print executer 22 exceeds a maximum output size $P_{max}$, the print instruction providing unit 101 does not provide a print instruction for the next page. Here, the maximum output size $P_{max}$ corresponds to the length of the transport path that is specified so that the productivity of the image output device 2 does not decrease, and is calculated on the basis of the productivity (ppm) and transport speed (mm/sec) of the image output device 2.

For example, in a case where $P_{max}$ is 2000 mm and a sheet size is A4L (one-sided printing), the length of ten pages of sheets in the sub-scanning direction is 2100 mm. It is assumed that, at time t=t1, a print instruction for pages p1 to p10 has been transmitted to the image output device 2. At time t=t1, if the print data is not a sample sheet (NO in S10), that is, if the print instruction providing unit 101 is to provide a print instruction for print data of page p11, the print instruction providing unit 101 obtains the total size P=2100 mm in the sub-scanning direction of the sheets for which the print instruction has been provided (S11), determines that $P \le P_{max}$ is not satisfied (NO in S12), and determines that a print instruction is not to be provided (S13).

Subsequently, at time t=t2, the print executing unit 200 causes the print executer 22 to execute printing on page p1 for which a print instruction is first provided among pages p1 to p10, and ejects a printed result of page p1 to the ejection tray 24. After the page has been ejected, the size in the sub-scanning direction of the ejected sheet is subtracted from the total size P, that is, the equation 2100−210=1890 mm is calculated.

Subsequently, at time t=t3, if the print data is not a sample sheet (NO in S10), that is, if the print instruction providing unit 101 is to provide a print instruction for print data of page p11, the print instruction providing unit 101 obtains the total size P=1890 mm in the sub-scanning direction of the sheets for which the print instruction has been provided (S11), determines that $P \le P_{max}$ is satisfied (YES in S12), adds the sheet size of page p11 to the total size P (S15), and provides a print instruction for page p11 (S14).

Subsequently, if the sample button is operated at time t=t4, the print data is a sample sheet at time t=t5 (YES in S10), and thus the print instruction providing unit 101 provides a print instruction for the sample sheet having the content of image data of a page for which a print instruction has not been provided by the print instruction providing unit 101, for example, in the case illustrated in FIG. 2, the sample sheet having the content of page p12 for which a print instruction is to be provided next time (S14).

The sample sheet information generating unit 102 of the print control device 1 generates sample sheet information, which is attribute information representing a page number of a sample sheet in a printed result, time to be taken until the sample sheet is output, and so forth (S4).

In the example illustrated in FIG. 2, the page number of the sample sheet is p12. Since the print instruction for pages p2 to p11 is processed before the sample sheet is ejected, the time to be taken until the sample sheet is output is calculated based on the productivity (ppm) of the image output device 2. The sample sheet information generating unit 102 generates sample sheet information by using the obtained information.

After time t=t5, a printing process is performed in the order of pages p2 to p11, and resulting printed results are ejected to the ejection tray 24. The sample sheet of page p12 is ejected to the sample sheet ejection tray 23.

During a time period from when the sample button 21 is operated and sample sheet information is generated to when the sample sheet is ejected to the sample sheet ejection tray 23, the sample sheet display unit 103 displays, on the display unit 13, the page number of the sample sheet and the estimated time of ejection on the basis of the sample sheet information (S5).

The image data of the sample sheet may be image data of a page for which a print instruction is to be provided by the print instruction providing unit 101 after the time when the sample button 21 is operated by the operator, and is not necessarily image data of a page for which a print instruction is to be provided next time (page p12 in the description given above). Even if the image data of the sample sheet is not the image data of the page for which a print instruction is to be provided next time, the print instruction providing unit 101 is able to specify the page number of the page to be output as a sample sheet, for example, by inserting the sample sheet after a predetermined page has been output after pressing of the sample button 21, and thus sample sheet information is generated and displayed. Alternatively, the operator may be allowed to designate a page to be output.

It may take time for the print executer 22 to switch the sheet transport path for a recorded sample sheet from the ejection tray 24 to the sample sheet ejection tray 23. In such a case, it is necessary, during an operation of switching the sheet transport path, to prevent straddling of the recorded sample sheet over a transport path switching portion. Thus, for example, the print instruction providing unit 101 may temporarily stop providing a print instruction so as to make a period in which no sheets are transported. The estimated time of ejection is calculated in consideration of the time period that is not necessary in normal printing and that is necessary to output a sample sheet.

(3) Sample Sheet Information Display Operation

Figure 3:
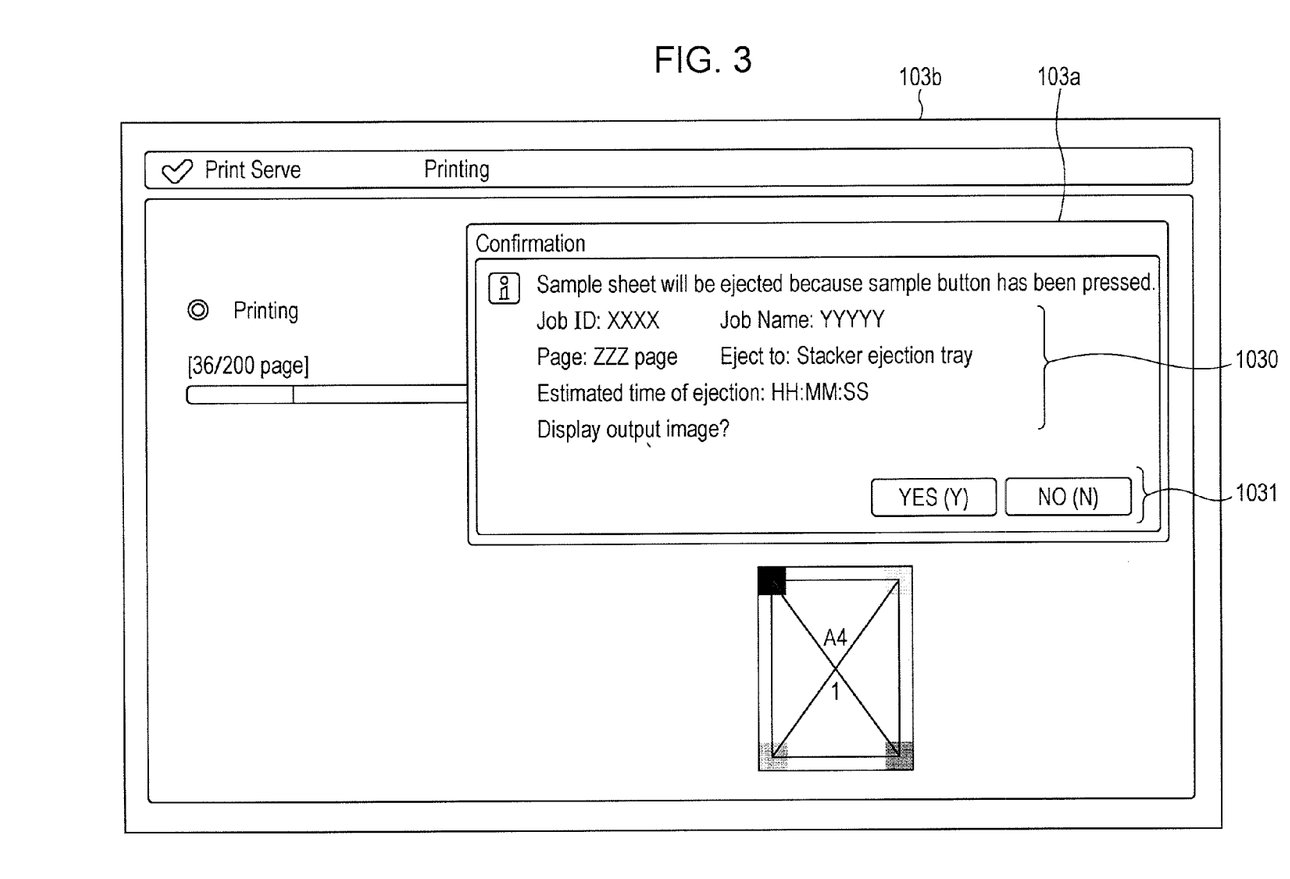
FIG. 3 is a schematic diagram for describing an operation of displaying sample sheet information.
Figure 4:
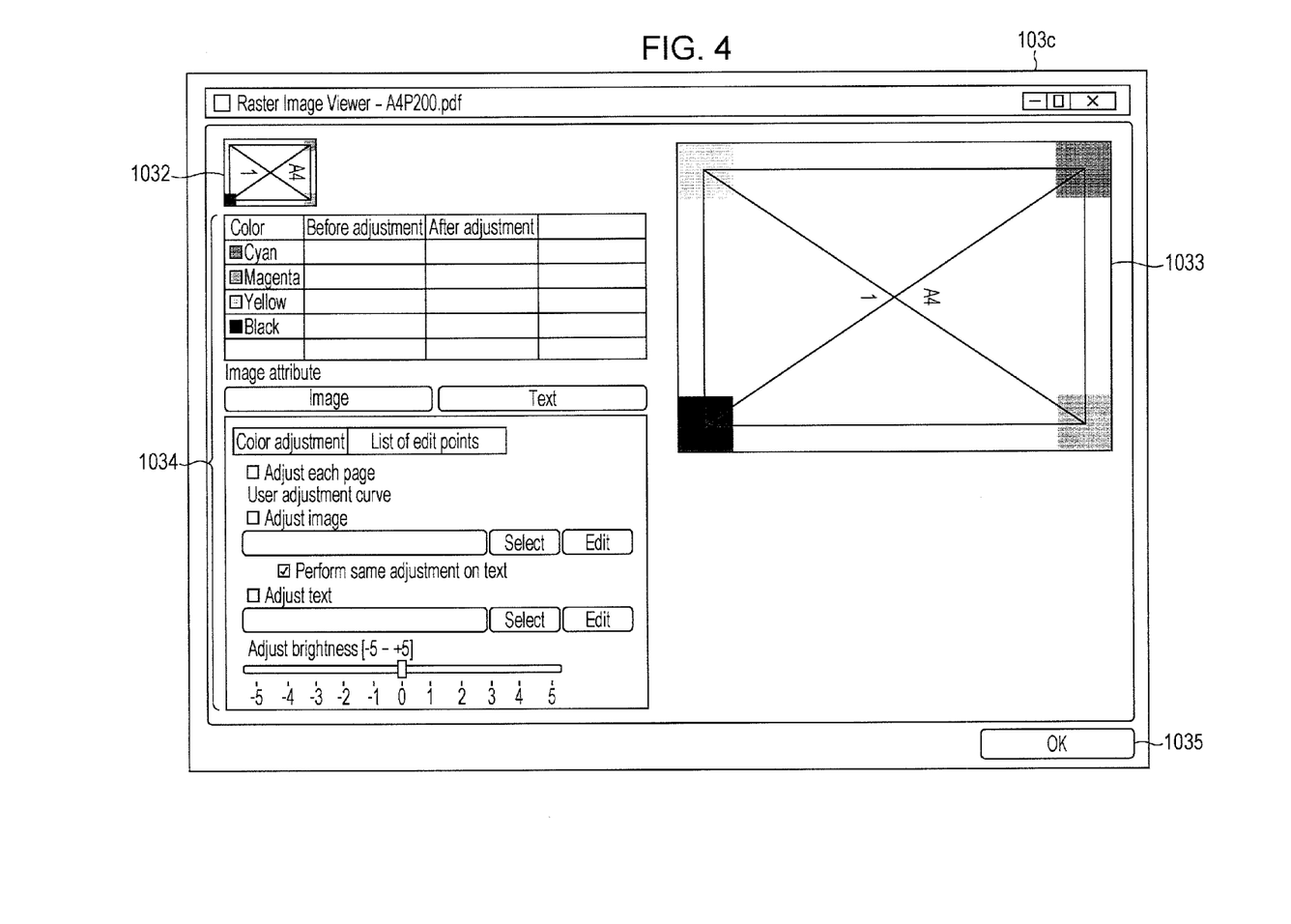
FIG. 4 is a schematic diagram for describing an operation of displaying an output image of a sample sheet.

FIG. 3 is a schematic diagram for describing an operation of displaying sample sheet information. FIG. 4 is a schematic diagram for describing an operation of displaying an output image of a sample sheet.

As illustrated in FIG. 3, a window 103a based on the sample sheet information is popped up, by the sample sheet display unit 103, on a screen 103b showing the status of a print job that is in progress (S5). The window 103a includes information 1030 representing a page, estimated time of ejection, job ID, job name, ejection destination, and so forth, and a button 1031 that is used to display an output image.

If "YES (Y)" of the button 1031 is operated (YES in S6), the sample sheet display unit 103 displays a detailed output image 103c illustrated in FIG. 4 (S7). The detailed output image 103c includes an output image thumbnail 1032, a detailed output image preview 1033, and a setting item group 1034 for performing adjustment so that the colors of the output image match the colors of the sample sheet to be ejected.

In such a case, color adjustment is performed during printing, and thus the page to be output as a sample sheet is selected by taking time for the adjustment into consideration. If the adjustment is not completed even after the estimated time of the adjustment has elapsed, input for color adjustment may be prohibited.

If a button 1035 is operated (YES in S8), the sample sheet display unit 103 displays the window 103a illustrated in FIG. 3 again.

If "NO (N)" of the button 1031 is operated (NO in S6), the sample sheet display unit 103 closes the window 103a (S9).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a receiving unit that receives a print job formed of a plurality of pages; a generating unit that generates print data of a sample sheet if a request for outputting a print result of the sample sheet to an ejection destination different from an ejection destination of the print job is received while print data corresponding to the print job received by the receiving unit is being generated, wherein the print data of the sample sheet is generated using image data of the print data corresponding to the print job; a print instruction providing unit that provides print instruction for the print data of the sample sheet after providing a print instruction for the print data that has been generated; and a display that displays, based on the print data of the sample sheet, an attribute of the sample sheet, wherein the functions performed by the generating unit and the print instruction providing unit are implemented by a first processor, and the functions performed by the receiving unit are implemented by a second processor.

2. The image forming apparatus according to claim 1, wherein the print instruction providing unit provides, for print data of a printed result other than the sample sheet, a new print instruction if a total sheet size in a transport direction of print data for which a print instruction has been provided is equal to or smaller than a predetermined size, and provides, for the print data of the sample sheet, a print instruction regardless of the total sheet size in the transport direction of the print data for which a print instruction has been provided.

3. The image forming apparatus according to claim 1, wherein the attribute includes at least one of a job ID, job name, output image, page number, ejection destination, and estimated time of ejection of the sample sheet.

4. The image forming apparatus according to claim 2, wherein the attribute includes at least one of a job ID, job name, output image, page number, ejection destination, and estimated time of ejection of the sample sheet.

5. An image forming system comprising: a receiving unit that receives a print job formed of a plurality of pages; a generating unit that generates print data of a sample sheet if a request for outputting a print result of the sample sheet to an ejection destination different from an ejection destination of the print job is received while print data corresponding to the print job received by the receiving unit is being generated, wherein the print data of the sample sheet is generated using image data of the print data corresponding to the print job; a print instruction providing unit that provides a print instruction for the print data of the sample sheet after providing a print instruction for the print data corresponding to the print job that has been generated; a printer that forms an image in accordance with the print data corresponding to the print job and the print data corresponding to the sample sheet; an ejection tray to which the sample sheet is ejected; and a display that displays, before the sample sheet is ejected to the ejection tray, an attribute of the sample sheet including at least one of the job ID, job name, output image, page number, ejection destination, and estimated time of ejection corresponding to the print data of the sample sheet, wherein the functions performed by the generating unit and the print instruction providing unit are implemented by a first processor, and the functions performed by the receiving unit are implemented by a second processor.

6. An image forming method comprising: receiving a print job formed of a plurality of pages; generating print data of a sample sheet if a request for outputting a print result of the sample sheet to an ejection destination different from an ejection destination of the print job is received while print data corresponding to the received print job is being generated, wherein the print data of the sample sheet is generated using image data of the print data corresponding to the print job; providing a print instruction for the print data of the sample sheet after providing a print instruction for the print data that has been generated; and displaying, based on the print data of the sample sheet, an attribute of the sample sheet.

7. A non-transitory computer readable medium storing a program causing a computer to execute a process for image formation, the process comprising: receiving a print job formed of a plurality of pages; generating print data of a sample sheet if a request for outputting a print result of the sample sheet to an ejection destination different from an ejection destination of the print job is received while print data corresponding to the received print job is being generated, wherein the print data of the sample sheet is generated using image data of the print data corresponding to the print job; providing a print instruction for the print data of the sample sheet after providing a print instruction for the print data that has been generated; and displaying, based on the print data of the sample sheet, an attribute of the sample sheet.

* * * * *